United States Patent
Mehrotra et al.

(10) Patent No.: US 9,656,331 B2
(45) Date of Patent: May 23, 2017

(54) SYSTEM AND METHOD FOR SIMULTANEOUSLY FORMING FLUTES IN SOLID CARBIDE TOOLS

(75) Inventors: Pankaj K. Mehrotra, Greensburg, PA (US); Christopher R. Duffus, Mt. Pleasant, PA (US); Edward T. Rebtoy, Latrobe, PA (US)

(73) Assignee: KENNAMETAL INC., Latrobe, PA (US)

( * ) Notice: Subject to any disclaimer, the term of this patent is extended or adjusted under 35 U.S.C. 154(b) by 1415 days.

(21) Appl. No.: 13/296,321

(22) Filed: Nov. 15, 2011

(65) Prior Publication Data

US 2013/0118313 A1    May 16, 2013

(51) Int. Cl.
| | | |
|---|---|---|
| B24B 19/04 | (2006.01) | |
| B21K 5/04 | (2006.01) | |
| B23C 3/32 | (2006.01) | |
| B24B 27/00 | (2006.01) | |
| B23P 15/32 | (2006.01) | |

(52) U.S. Cl.
CPC ............ B23C 3/32 (2013.01); B24B 19/04 (2013.01); B24B 27/0076 (2013.01); B23P 15/32 (2013.01); *Y10T 409/300504* (2015.01); *Y10T 409/300728* (2015.01); *Y10T 409/307784* (2015.01)

(58) Field of Classification Search
CPC . B23C 3/32; B23P 15/32; B24B 19/04; B24B 27/0076; Y10T 409/300504; Y10T 409/300728; Y10T 409/307784
See application file for complete search history.

(56) References Cited

U.S. PATENT DOCUMENTS

| | | | | |
|---|---|---|---|---|
| 2,569,855 A | * | 10/1951 | Hertlein | .......... 451/274 |
| 2,902,259 A | | 9/1959 | Tilden | |
| 3,610,075 A | * | 10/1971 | Fabish | .......... 76/108.6 |
| 4,115,956 A | * | 9/1978 | Huffman | .......... 451/4 |
| 4,608,643 A | * | 8/1986 | Breitenstein et al. | ........ 700/164 |
| 4,779,440 A | | 10/1988 | Cleve et al. | |
| 5,070,748 A | | 12/1991 | Packer | |
| 5,231,802 A | * | 8/1993 | Hosoi | .......... 451/48 |
| 5,297,456 A | | 3/1994 | Nishimura | |
| 5,398,572 A | * | 3/1995 | Hashimoto et al. | ......... 76/107.1 |
| 5,762,538 A | * | 6/1998 | Shaffer | .......... 451/36 |

(Continued)

FOREIGN PATENT DOCUMENTS

| | | |
|---|---|---|
| CN | 1053903 C | 6/2000 |
| CN | 1483543 A | 3/2004 |

(Continued)

OTHER PUBLICATIONS

Machine English translation of DE 10 2010 041 164 A1 , Mar. 2012.*
CN 201210456795.8, Dec. 28, 2015 First office action.

*Primary Examiner* — Hwei C Payer
(74) *Attorney, Agent, or Firm* — Matthew S. Bedsole

(57) ABSTRACT

A system for simultaneously forming multiple flutes in a carbide rotary cutting tool includes a chuck adapted to grasp a green rod member and selectively rotate the green rod member about, and translate the green rod member along, a first axis. The system further includes a mechanism adapted to simultaneously machine multiple flutes in the green rod member as the green rod member is rotated about, and translated along, the first axis.

6 Claims, 4 Drawing Sheets

(56) References Cited

U.S. PATENT DOCUMENTS

| | | | |
|---|---|---|---|
| 6,050,754 A * | 4/2000 | Thomas | 408/230 |
| 6,155,148 A | 12/2000 | Shinozaki et al. | |
| 6,540,452 B1 | 4/2003 | Bolkart | |
| 6,638,474 B2 * | 10/2003 | Liu | C22C 1/055 419/14 |
| 6,669,414 B1 * | 12/2003 | Puide et al. | 408/144 |
| 6,840,722 B1 | 1/2005 | Nonaka | |
| 7,201,543 B2 * | 4/2007 | Muhlfriedel et al. | 408/230 |
| 7,322,105 B2 * | 1/2008 | Lewis | A61C 5/023 29/27 C |
| 7,340,978 B2 * | 3/2008 | Kugelberg et al. | 76/108.6 |
| 7,922,428 B2 * | 4/2011 | Weerasinghe | C23C 14/042 408/144 |
| 8,272,295 B2 * | 9/2012 | Smith et al. | 76/108.2 |
| 2005/0031423 A1 | 2/2005 | Kugelberg | |
| 2006/0288820 A1 * | 12/2006 | Mirchandani | B21C 23/22 76/108.1 |
| 2008/0152444 A1 | 6/2008 | Kugelberg et al. | |
| 2010/0272531 A1 * | 10/2010 | Shavit | 408/59 |
| 2013/0118313 A1 * | 5/2013 | Mehrotra et al. | 76/108.6 |
| 2016/0023284 A1 * | 1/2016 | Goldsmith | B23C 5/10 409/131 |
| 2016/0263665 A1 * | 9/2016 | Mehrotra | B23B 51/06 |

FOREIGN PATENT DOCUMENTS

| | | |
|---|---|---|
| CN | 101534982 B | 4/2011 |
| CN | 101801574 B | 10/2011 |
| DE | 19707549 A1 | 9/1997 |
| DE | 19856986 A1 | 7/1999 |
| DE | 10238334 A1 | 2/2004 |
| DE | 102010041164 A1 | 3/2012 |
| DE | 10 2012 021 718 B4 * | 12/2014 |
| WO | 00/74870 A1 | 12/2000 |

* cited by examiner

SYSTEM AND METHOD FOR SIMULTANEOUSLY FORMING FLUTES IN SOLID CARBIDE TOOLS

BACKGROUND

Field of the Invention

The present invention relates to a method of making a rotary tool formed by a powder metallurgy process for chip removing machining with at least two helically extending chip flutes. The invention also relates to a system for performing such method.

Background Information

Tools such as twist drills or end mills are generally manufactured starting from sintered cylindrical blanks in which chip flutes are ground and a shank portion without flutes is formed. Sometimes, a ground blank is subsequently attached to a cylindrical shank to form the finished tool. This is an expensive and time consuming manufacturing route. The problem has partly been solved by extrusion molding of hard metal mixed in a carrier such as disclosed in U.S. Pat. No. 4,779,440. An extruded drill blank having chip flutes of constant pitch along the circumference of the blank is obtained by heating a hard metal powder to extrusion temperature, pressing the heated powder through a space defined by a mandrel and a nozzle while rotating the blank. The blank is guided by the extrusion in direction past a helical ridge provided inside of the nozzle, to shape chip flutes along the blank. A drawback of this known technique is that the chip flutes are obtained along the entire length of the blank and, after having been cut into suitable length, has to be joined to a shank in order to provide a suitable portion of mounting in a machine tool.

Another solution is disclosed in WO 00/74870 according to which a rotary tool such as a helix drill or an end mill for example, is manufactured by forming a blank by an extrusion process. During the extrusion, a mixture is passed through a die which provides a cylindrical shape to the outer peripheral surface of the mixture. A plurality of jaws are disposed downstream of the die for conducting the mixture. Each jaw includes a helical ridge for engaging the outer surface of the extruded mass to cause a helical groove to be formed therein which constitutes a chip flute in the tool. During the extrusion, the jaws are moved away from the mixture to terminate formation of the chip grooves, and thus form a shank portion on the tool. The drawbacks of this method is that the cooling channels may be negatively affected by the formation of the flutes. One set of jaws can only produce one type of flute geometry. If a different pitch is desired a different set of jaws has to be used. The cooling channels are formed during twisting.

U.S. Pub. No. 2008/0152444 A1 also describes a method of forming flutes in a tool body as the body is extruded. The method utilizes chisels that form flutes in the relatively soft material as it is extruded prior to sintering. The chisels are retractable so that a shank portion without flutes may be formed prior to the green-body being separated from the extruding machine. While an improvement to the methods previously discussed, such method is limited as to the dimensional accuracy of the flutes formed as well as the quantity of flutes that may be formed as the material to be cut is soft at this stage and is difficult to cut with good accuracy. Furthermore, as with the methods previously discussed, such method is only applicable to extruded rods, and not to rods made by direct pressing.

Accordingly, there exists a need for improved methods for forming cutting tools and systems for carrying out such methods.

SUMMARY OF THE INVENTION

Accordingly, deficiencies in the prior art are addressed by embodiments of the invention which are directed to a system for simultaneously forming multiple flutes in a rotary cutting tool and a method for forming a rotary cutting tool.

As one aspect of the invention, a system for simultaneously forming multiple flutes in a rotary cutting tool is provided. The system comprise a chuck adapted to grasp a green rod member and selectively rotate the green rod member about, and translate the green rod member along, a first axis. The system further comprises a mechanism adapted to simultaneously machine multiple flutes in the green rod member as the green rod member is rotated about, and translated along, the first axis.

The mechanism may comprise a first cutting tool adapted to selectively rotate and translate about a second axis and a second cutting tool adapted to selectively rotate and translate about a third axis, wherein the first and second cutting tools are adapted to engage and simultaneously perform machining operations on portions of the green rod member.

The first and second cutting tools may each comprise an end mill.

The first and second cutting tools may each comprise a grinding wheel.

The mechanism may further comprise a third cutting tool adapted to selectively rotate and translate about a fourth axis, wherein the third cutting tool is adapted to engage and perform machining operations on the green rod member simultaneously with the first and second cutting tools. The mechanism further comprise a fourth cutting tool adapted to selectively rotate and translate about a fifth axis, wherein the fourth cutting tool is adapted to engage and perform machining operations on the green rod member simultaneously with the first, second, and third cutting tools.

As another aspect of the invention, a method for forming a rotary cutting tool is provided. The method comprises: securing a green rod member in a chuck mechanism, the chuck mechanism being adapted to rotate about, and translate along, a first axis in a predetermined manner; simultaneously forming a plurality of flutes in the green rod member; removing the green rod member from the chuck mechanism; sintering the green rod member to produce a sintered rod member; and performing one or more grinding operations on the sintered rod member to produce a finished rotary cutting tool.

Simultaneously forming a plurality of flutes in the green rod member may comprise simultaneously machining a plurality of flutes using a plurality of end mills.

Simultaneously forming a plurality of flutes in the green rod member may comprise simultaneously machining a plurality of flutes using a plurality of grinding wheels.

Simultaneously machining a plurality of flutes using a plurality of end mills may comprise rotating the green rod member about, and translating the green rod member along the first axis while the green rod member is machined by the plurality of end mills.

Performing one or more grinding operations on the sintered rod member may comprise: performing a grinding operation on the sintered rod member; and performing a finish hone to at least selected portions of the sintered rod member.

Performing one or more grinding operations on the sintered rod member may comprise applying a coating to the sintered rod member.

These and other objects, features, and characteristics of the present invention, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention.

BRIEF DESCRIPTION OF THE DRAWINGS

A full understanding of the invention can be gained from the following description of the preferred embodiments when read in conjunction with the accompanying drawings in which.

DESCRIPTION OF THE PREFERRED EMBODIMENTS

Figure 1:
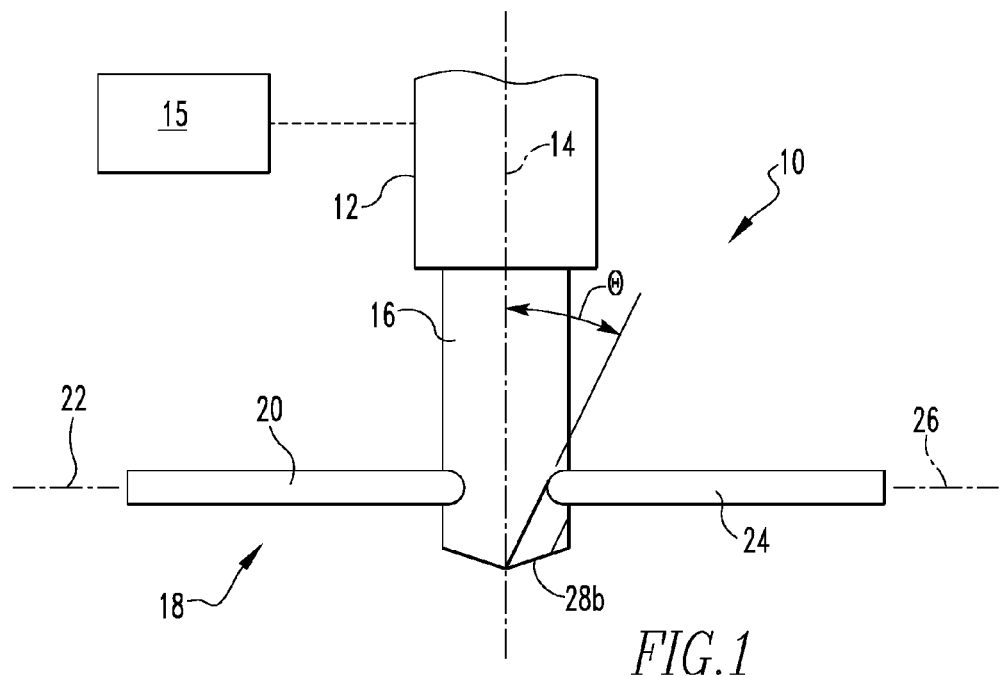
FIG. 1 is a schematic side view of a system for forming a carbide rotary cutting tool in accordance with an example embodiment of the present invention.

Directional phrases used herein, such as, for example, left, right, front, back, top, bottom and derivatives thereof, relate to the orientation of the elements shown in the drawings and are not limiting upon the claims unless expressly recited therein. Identical parts are provided with the same reference number in all drawings.

As used herein, the term "number" shall be used to refer to any non-zero quantity (i.e., one or any quantity greater than one).

As used herein, the terms "multiple" or "plurality" shall be used to refer to any quantity of two or more (i.e., any quantity greater than one).

As used herein, the term "about" shall be used to refer to a point near, or at, a particular identified point (i.e., proximate).

Figure 2:
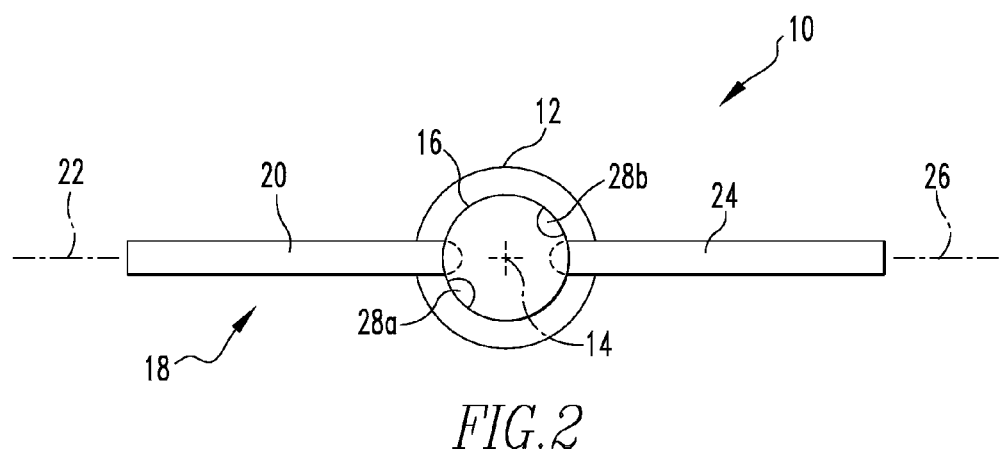
FIG. 2 is a schematic bottom view of the system of FIG. 1.

FIGS. 1 and 2 respectively, depict side and bottom schematic views of an example system 10 for simultaneously forming a number of flutes in a rotary cutting tool in accordance with an embodiment of the invention. System 10 includes a chuck 12 or other suitable mechanism that is adapted to selectively rotate and translate about a first axis 14 in a controlled manner. Preferably, the rotation and translation of chuck 12 about first axis 14 is controlled by a processing device such as a computer 15 or other suitable mechanism. Chuck 12 is adapted to firmly grasp a green rod member 16. Preferably, the jaws of chuck 12 should hold green rod member 16 with sufficient rigidity for operation without crushing or chipping the green material. As used herein, the term "green" shall be used to refer to a material that has not yet been fully sintered (i.e., un-sintered or partially sintered). Green rod member 16 may be formed from carbide, cermets, ceramics, steel, or other suitable material that has been shaped in a generally cylindrical rod member via extruding, pressing, or any other suitable forming process prior to being placed in chuck 12. In some embodiments, green rod member 16 may include one or more through-holes which may be used for delivering coolant to selected portions of the finished cutting tool. Such through-holes may be formed straight or spiraling at a predetermined pitch depending on the desired application. Additionally, green rod member 16 may be a hollow rod formed from a close-ended tube (in order to reduce material used) or may be a composite rod formed from multiple materials (e.g., without limitation, a shank formed from a lesser expensive material and a green material used for the cutting portion).

System 10 further includes a mechanism 18 adapted to simultaneously machine multiple flutes in green rod member 16 as green rod member 16 is rotated about, and translated along, first axis 14 by controlled movement of chuck 12. In the example embodiment illustrated in FIGS. 1 and 2, mechanism 18 includes a first rotary cutting tool 20 adapted to selectively rotate and translate about a second axis 22 and a second rotary cutting tool 24 adapted to selectively rotate and translate about a third axis 26 such that first and second rotary cutting tools 20, 24 may selectively engage and simultaneously perform machining operations on green rod member 16 in order to form respective flutes 28a and 28b in green rod member 16. Preferably, first and second rotary cutting tools 20, 24 are ball nose end mills although other suitable rotary cutting tools may also be utilized without varying from the scope of the present invention. The selective rotation and translation of first and second rotary cutting tools 20, 24 may be carried out through the use of similar mechanisms as chuck 12 or any other suitable mechanism that at minimum can both rotate and translate a cutting tool in a predetermined manner. It is to be understood that different schemes of rotations and translations of one or more of green rod member 16, first rotary cutting tool 20, and second rotary cutting tool 24 may be devised to form flutes 28a and 28b in a desired arrangement.

It is to be appreciated that by selectively controlling the rotation and translation of green rod member 16 about first axis 14, the helix angle θ (FIG. 1) of flutes 28a and 28b formed in green rod member 16 may be selectively varied while only rotating first and second rotary cutting tools 20, 24 about their respective axis 22, 26 (i.e., not translating cutting tools 20, 24). Similarly, the depth (not numbered) of either of flutes 28a or 28b may be selectively varied by controlling the translation of one or both of first and second rotary cutting tools 20 and 24 along second and third axis 22 and 26. Furthermore, the axial cross-sectional shape of either of flutes 28a or 28b may be varied by varying the shape of the leading end (not numbered) of rotary cutting tools 20, 24.

Although shown in FIG. 2 as being spaced generally 180° with respect to each other about green rod member 16, it is to be appreciated that first and second rotary cutting tools 20 and 24 may be disposed at other intervals about green rod member 16 without varying from the scope of the present invention.

It is also to be appreciated that the present invention contemplates that the position and orientation of second and third axis 22 and 26 may be selectively adjusted (i.e., translated and/or rotated about one or more additional axis) in a predetermined manner to vary the formation of flutes in green rod member 16 as desired for a particular application, and as such the orientation of second and third axis 22 and 26 is not limited to the positions described and depicted herein.

Figure 3:
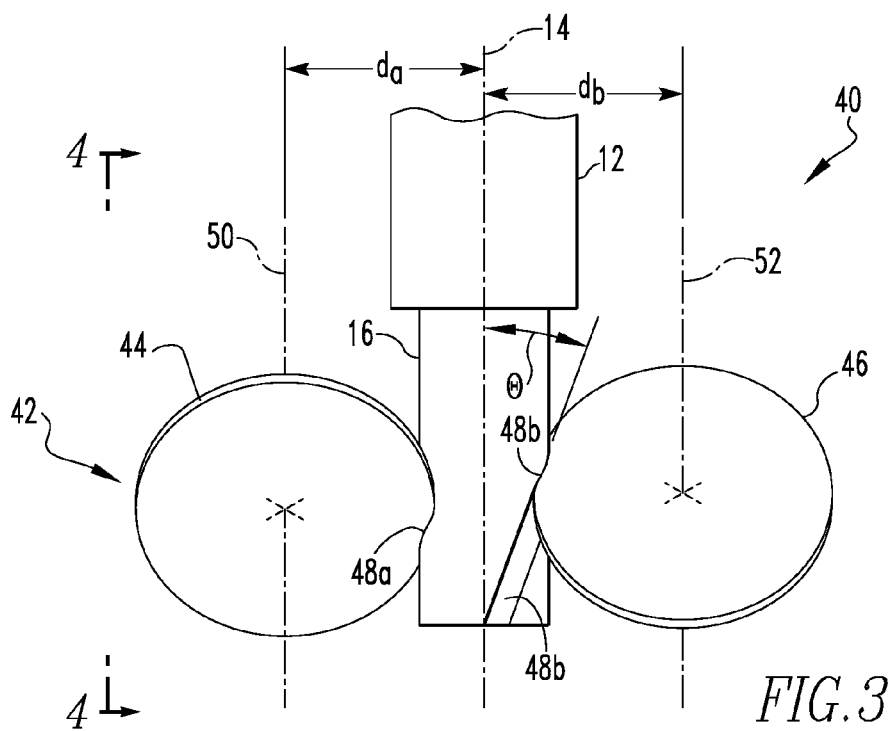
FIG. 3 is a schematic side view of a system for forming a carbide rotary cutting tool in accordance with another example embodiment of the present invention.
Figure 4:
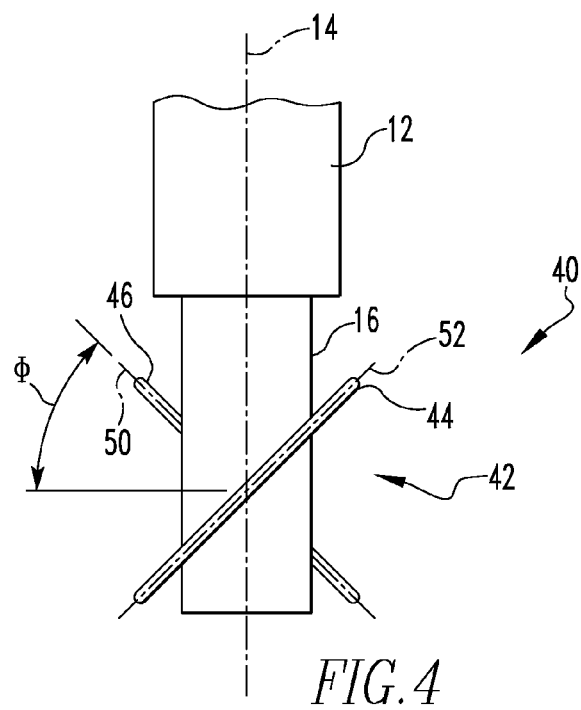
FIG. 4 is another schematic side view of the system of FIG. 3 taken along line 4-4 of FIG. 3.

FIGS. 3 and 4, depict side schematic views of an example system 40 for simultaneously forming a number of flutes in a rotary cutting tool in accordance with another embodiment of the invention. Like system 10, previously discussed, system 40 includes a chuck 12 or other suitable mechanism that is adapted to grasp a green rod member 16 and to selectively rotate and translate such rod member about a first axis 14 in a controlled manner. However, unlike system 10 which employs first and second rotary cutting tools 20 and 24 as portions of mechanism 18 for simultaneously machining multiple flutes, system 40 of FIGS. 3 and 4 utilizes a mechanism 42 that instead employs a first grinding wheel 44 and a second grinding wheel 46 to form flutes 48a and 48b, respectively, in green rod member 16. In such embodiment, each of first and second grinding wheels 44 and 46 are coupled to rotatable member (not shown) that is adapted to selectively rotate the respective one of grinding wheels 44 and 46 coupled thereto about a respective axis 50, 52. Suitable mechanisms having such rotatable members are commonly known in the art.

Continuing to refer to FIGS. 3 and 4, the helix angle θ (FIG. 3) of flutes 48a, 48b formed in green rod member 16 may be selectively varied by varying the angle φ of first or second axis 50, 52 with respect to a plane (not shown) normal to first axis 14. The depth (not numbered) of each of flutes 48a and 48b may be selectively varied by varying the respective distance $d_a, d_b$ (FIG. 3) between either of axis 50, 52 and first axis 14. Furthermore, the axial cross-sectional shape of either of flutes 48a or 48b may be varied by varying one or both of: the shape of the grinding edge (not numbered) of grinding wheels 44 and 46 and/or the angle φ of the axis about which such grinding wheel rotates along with the translation and or rotation speed of green rod member 16 (i.e., θ would not be equal to φ).

Although shown in FIGS. 3 and 4 as being disposed generally 180° with respect to each other about green rod member 16, it is to be appreciated that first and second grinding wheels 44 and 46 may be disposed at other intervals about green rod member 16 without varying from the scope of the present invention.

It is also to be appreciated that the present invention contemplates that the position and/or orientation of either or both of axis 50 and 52 may be selectively adjusted (i.e., translated and/or rotated about one or more additional axis) in a predetermined manner to vary the formation of flutes in green rod member 16 as desired for a particular application, and as such the orientation of axis 50 and 52 is not limited to the positions described and depicted herein.

Figure 5:
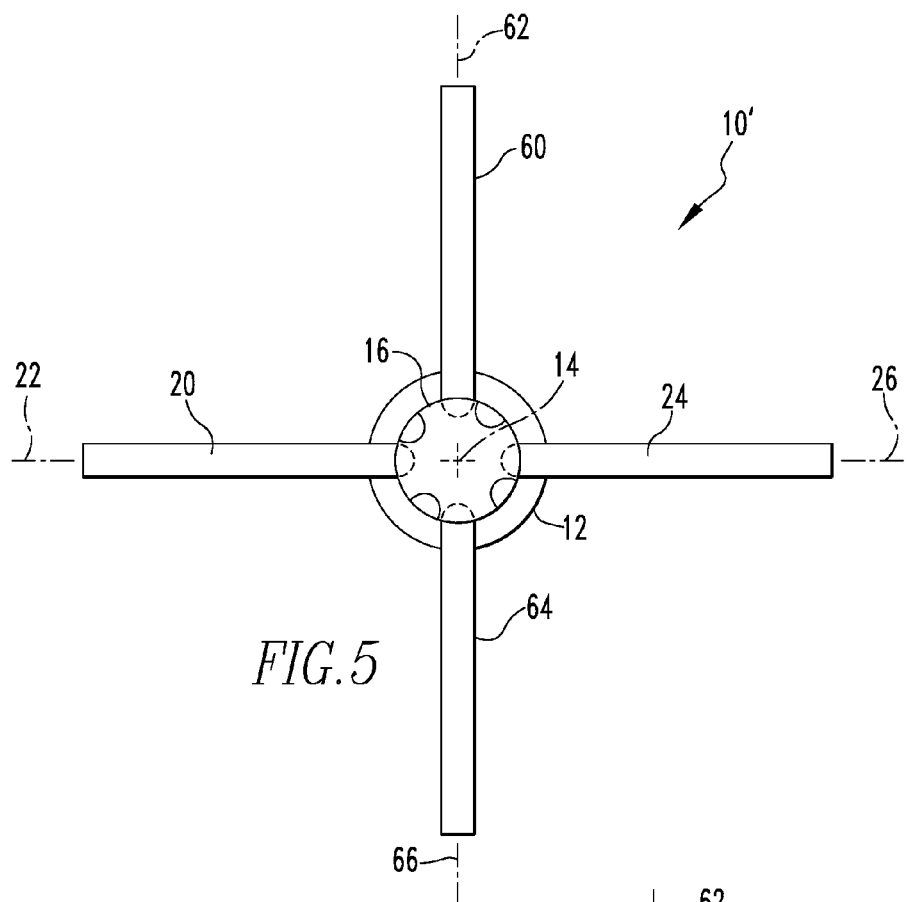
FIG. 5 is a schematic bottom view of a system for forming a carbide rotary cutting tool in accordance with yet another example embodiment of the invention.
Figure 6:
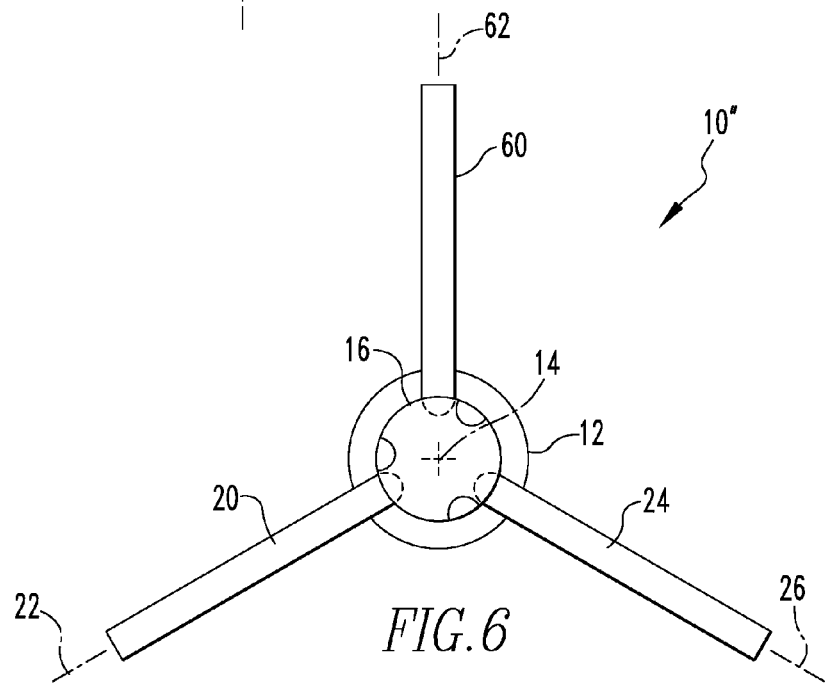
FIG. 6 is a schematic bottom view of a system for forming a carbide rotary cutting tool in accordance with a further example embodiment of the invention.

FIGS. 5 and 6 depict schematic bottom views of examples of further embodiments of the present invention which demonstrate systems for simultaneously machining other numbers of multiple flutes in a green rod member 16 mounted in a chuck 12 as previously described. More particularly, FIG. 5 depicts a system 10' that is similar to system 10, as previously discussed, with the addition of a third rotary cutting tool 60 that is rotatable and translatable about a fourth axis 62 and a fourth rotary cutting tool 64 that is also rotatable and translatable about a fifth axis 66 such that each of the first, second, third and fourth rotary cutting tools 20, 24, 60, 64 are adapted to simultaneously engage and perform machining operations on portions of green rod member 16. Similarly, FIG. 6 depicts a system 10" that utilizes three rotary cutting tools 20, 24 and 60 to simultaneously engage and perform machining operations on portions of green rod member 16 mounted in chuck 12.

Although FIGS. 5 and 6 show the use of rotary cutting tools, such as end mills, for simultaneously forming multiple flutes in green rod member 16, it is to be appreciated that the present invention contemplates that grinding wheels, such as described in connection with FIGS. 3 and, 4 may instead be employed in similar configurations as shown in FIGS. 5 and 6.

It is also to be appreciated that the present invention contemplates that the position and orientation of any of axis 22, 26, 62 or 66 may be selectively adjusted (i.e., translated and/or rotated about one or more additional axis) in a predetermined manner to vary the formation of flutes in green rod member 16 as desired for a particular application, and as such the orientation of axis 22, 26, 62 or 66 is not limited to the positions described and depicted herein.

Figure 7:
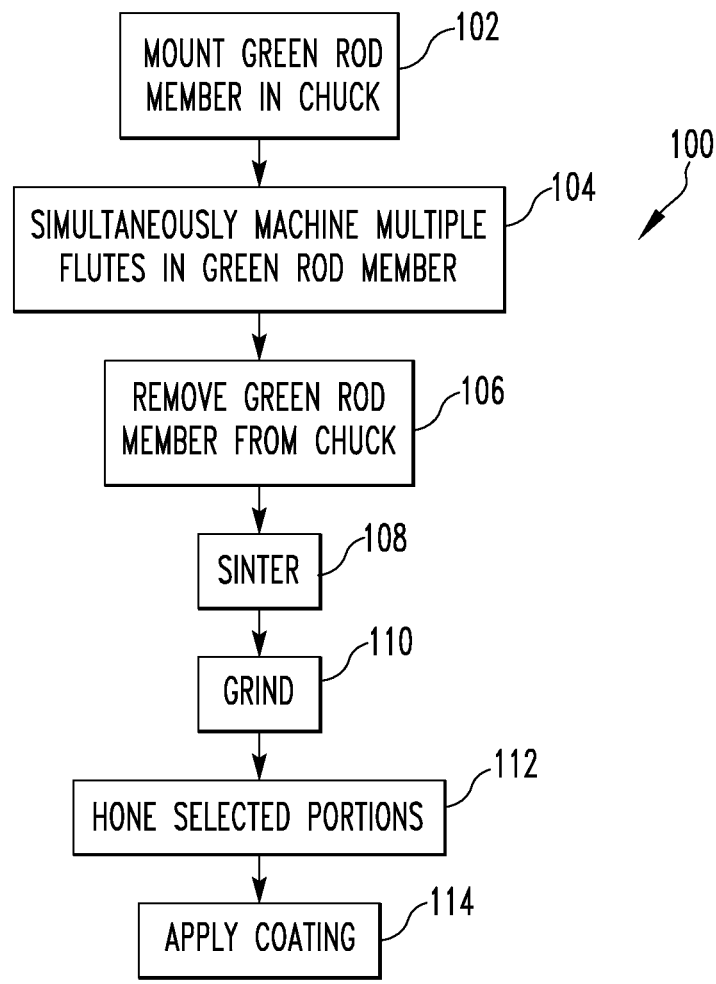
FIG. 7 is an example method of forming a rotary cutting tool in accordance with an example embodiment of the present invention.

Having thus described a number of example embodiments of machining systems in accordance with the present invention, an example method 100 of forming a rotary cutting tool in accordance with the present invention utilizing the system 10 of FIGS. 1 and 2 will now be described in conjunction with FIG. 7. It is to be appreciated, however, that such method could be similarly carried out using any system in accordance with the present invention and as such, the particular references to elements of FIGS. 1 and 2 are not intended to be limiting but instead are provided for example purposes only.

As a first step, 102, green rod member 16 (previously formed from any suitable means) is mounted in chuck 12. Next at step 104, multiple flutes 28a, 28b are simultaneously formed in green rod member 16. The simultaneous formation of multiple flutes may be carried out by machining or grinding operations carried out by two or more rotary cutting tools (e.g., without limitation, end mills) or grinding wheels. Such machining or grinding operations may be carried out while rotating and translating the green rod member 16 about first axis 14 (via chuck 12).

Once flutes 28a and 28b have been formed, the fluted green rod member 16 is removed from chuck 12, such as shown in step 106.

After being removed from chuck 12, fluted green rod member 16 is sintered, such as shown in step 108, via any suitable means, producing a sintered rod member.

After sintering, the sintered rod member is next ground, as necessary, to desired finished shapes and/or tolerances, such as shown in step 110.

Optionally, as shown in step 112, cutting edges of the sintered fluted rod member may be honed or the flutes may be polished, as necessary, via any suitable means, thus producing a finished rotary cutting tool in accordance with the present invention.

Optionally, a coating (e.g., without limitation, TiN or TiAlN) may be applied to the sintered rod member, such as shown in step 114, via an suitable means (e.g., without limitation CVD, PVD).

It is to be appreciated that the method of forming a rotary cutting tool is generally faster than other known methods for a number of reasons. First, forming multiple flutes at time is generally faster than forming each flute individually at a given time. Also, finish grinding of rods and flutes can be done faster as less material needs removed as compared to grinding from sold rods. Furthermore, it is to be appreciated that by performing the bulk of machining operations on a green rod member, a number of further advantages are realized. As one advantage, the as the green material is generally quite soft, the wear rate of the machining tools used to form the flutes in green rod member is reduced, thus increasing the amount of tools produced by each machine tool before needing replaced. As another advantage, the material removed from green rod member during machining is readily recyclable for use in forming other green rods, thus generally eliminating costly waste materials.

While specific embodiments of the invention have been described in detail, it will be appreciated by those skilled in the art that various modifications and alternatives to the details provided herein could be developed in light of the overall teachings of the disclosure. Accordingly, the particular arrangements disclosed are meant to be illustrative only and not limiting as to the scope of the invention which is to be given the full breadth of the claims appended and any and all equivalents thereof.

In the claims, any reference signs placed between parentheses shall not be construed as limiting the claim. The word "comprising" or "including" does not exclude the presence of elements or steps other than those listed in a claim. In a device claim enumerating several means, several of these means may be embodied by one and the same item of hardware. The word "a" or "an" preceding an element does not exclude the presence of a plurality of such elements. In any device claim enumerating several means, several of these means may be embodied by one and the same item of hardware. The mere fact that certain elements are recited in mutually different dependent claims does not indicate that these elements cannot be used in combination.

What is claimed is:

1. A method for forming a rotary cutting tool, the method comprising:
   securing a green rod member which has been previously formed in a generally cylindrical shape in a chuck mechanism, the chuck mechanism being adapted to rotate about, and translate along, a first axis in a predetermined manner;
   simultaneously forming a plurality of flutes in the green rod member by machining;
   removing the green rod member from the chuck mechanism;
   sintering the green rod member to produce a sintered rod member; and
   performing one or more grinding operations on the sintered rod member to produce a finished rotary cutting tool.

2. The method of claim 1 wherein simultaneously forming a plurality of flutes in the green rod member comprises simultaneously machining a plurality of flutes using a plurality of end mills.

3. The method of claim 2 wherein simultaneously machining a plurality of flutes using a plurality of end mills comprises rotating the green rod member about, and translating the green rod member along the first axis while the green rod member is machined by the plurality of end mills.

4. The method of claim 1 wherein simultaneously forming a plurality of flutes in the green rod member comprises simultaneously machining a plurality of flutes using a plurality of grinding wheels.

5. The method of claim 1 wherein performing one or more grinding operations on the sintered rod member comprises:
   performing a grinding operation on the sintered rod member; and
   performing a finish hone to at least selected portions of the sintered rod member.

6. The method of claim 5 further comprising applying a coating to the sintered rod member.

* * * * *